July 6, 1965 V. A. EHRESMAN ETAL 3,193,694
PERMANENT SWITCHABLE PARAMETRIC DEVICE BIAS
Filed July 10, 1961
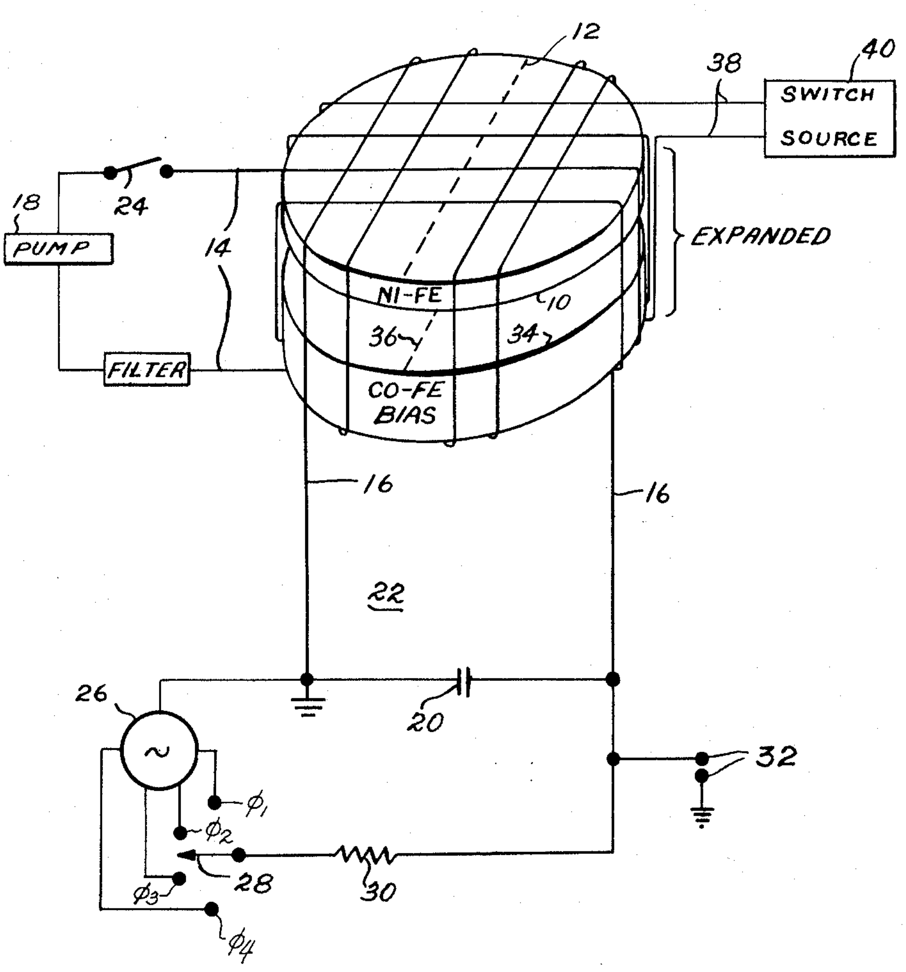
INVENTORS
VIRGIL A. EHRESMAN
CHARLES D. OLSON
BY Cushman, Darby & Cushman
ATTORNEYS 3,193,694
Patented July 6, 1965

3,193,694

PERMANENT SWITCHABLE PARAMETRIC DEVICE BIAS

Virgil A. Ehresman, Richfield, and Charles D. Olson, Dakota County, Minn., assignors to Sperry Rand Corporation, New York, N.Y., a corporation of Delaware Filed July 10, 1961, Ser. No. 122,922
8 Claims. (Cl. 307—88)

This invention relates to parametric devices, and particularly to parametric oscillators of the phase locked type and employing a multi-stable magnetic film.

In the co-pending applications of Davis et al. Serial No. 61,981, filed October 7, 1960, and Ehresman Serial No. 81,360, filed January 9, 1961, there are described and claimed magnetic parametric devices (amplifiers and oscillators) requiring only a single magnetic film, as opposed to the dual toroids required by the prior art. Films employed may be of the type which have two different substantially magnetized stable states and which generally are referred to as normally bistable. In each of those applications the disclosure of both of which is incorporated hereinto by reference, it is recognized that biasing of the film is desirable for higher frequency operation of the parametric device. The present invention is particularly directed to this biasing feature, and employs a second bistable film to effect the desired biasing of the first. The second film has a high external field compared to the first film and can be switched between its two stable states to provide from the parametric device four differently phased output signals.

It is therefore an object of this invention to provide a permanent but switchable magnetic biasing element in a magnetic film parametric device to allow for high frequency operation thereof in any one of four different phase conditions.

Still other objects and advantages of this invention will become apparent upon reading the following detailed description in conjunction with the drawing, and the appended claims.

The parametric device illustrated in the drawing is a phase locked parametric oscillator, frequently termed a "parametron." The illustration is similar to those in the aforementioned applications, in that there is included a magnetic film 10 with an easy magnetization axis 12 and crossed conductors forming input and output windings, or lines, 14 and 16, respectively, preferably oriented at right angles to each other. Also, the input line 14 is energizable by a varying signal from pump 18 to cause application to film 10 of a varying field along easy axis 12 as an one embodiment in said application Serial No. 61,981, or at an angle thereto as in one embodiment in the other aforementioned application, either of which causes reversible oscillation of the effective magnetization vector of that film and an effective negative resistance to appear across output line 16. Further like the aforesaid applications, the output winding forms with condenser 20 a tank circuit 22 in which oscillations are created when switch 24 is closed so that the pump field is applied. These oscillations are caused to be in one or the other of two phases which are 180° out of phase according to whether the control signal from source 26 as applied to the tank circuit by switch 28 via resistor 30 is of phase 1 or phase 2, these two phases also being 180° apart. The signal which appears at the output terminals 32 is in phase with the selected one (for example, 1) of the control signals from source 26 when the magnetic vector of film 10 oscillates with reference to a given one of its two possible opposite directions about the easy axis 12. If the magnetization vector of film 10 oscillates with reference to the other of such opposite directions, then the oscillations in tank circuit 22 and the output signals at terminals 32 are 90° out of phase with that same selected one (1, again, for example) of the control signals from source 26. That is, when the vector of film 10 oscillates relative to a first stable state of that film, the output oscillations at terminals 32 will be in phase with the 1 control signal or the 2 control signal according to which is selected by switch 28, whereas if the vector of film 10 oscillates with reference to the other stable state of that film, then the output oscillations are 90° out of phase in one direction (for example, advanced) with the 1 control signal or 90° out of phase in that same direction with the 2 control signal, according to which one of these control signals was applied.

The main advance in this application over the foresaid applications is the addition of a switchable bistable magnetic element, such as film 34, for purposes of biasing film 10. In the drawing, the easy axis 36 of the added film is illustrated as being substantially parallel to the easy axis 12 of film 10, though this exact relationship is not essential. Since the effective magnetization vector of film 34 substantially lies in one direction or the other along easy axis 36, it is apparent that the external field of film 34 will bias the magnetization vector of film 10 in a direction along easy axis 12.

The external field, sometimes referred to as the demagnetizing field, of film 34 is made sufficiently large compared to the external field of film 10, to effect the desired biasing of film 10. Generally speaking, the thicker the film, the larger its external field. The coercivity of film 10, on the other hand, is correlated with the strength of the external field of film 34 so that the state of film 34 determines the state of film 10. Since these magnetic films are open flux path type elements, when the magnetization vector of 34 is in a given one of its two directions along easy axis 36 (for example, upward in the drawing), this causes the magnetization vector of film 10 to be in the opposite direction (i.e., directed downwardly, in keeping with the example), and vice versa, with each film partially completing the otherwise open flux path of the other.

To set film 10 initially in a desired one of either of its two stable states, the magnetization vector of film 34 is caused to be directed in a direction opposing the desired direction for the magnetization vector of film 10, by applying an appropriately directed field to film 34 via a winding or line 38 from a switching source 40.

Film 10, as indicated in the above mentioned applications, is preferably a metal alloy, for example of the "Permalloy" type, with greatest preference being given to non-magnetostrictive films containing substantially 81% nickel, remainder iron, made for example in accordance with the teachings of the Rubens Patent 2,900,282. On the other hand, film 34 is preferably composed of cobalt ranging, for example, from 80 to 95%, remainder iron, and it too may be made by an evaporation technique such as in the above named Rubens patent. Since the magnetization vector of film 10 is caused to oscillate when the pump field is applied, it is necessary that the coercive value of film 34 be high enough to prevent switching of its magnetization vector by the pump and external field of film 10 during operation of the oscillator. In other words, the coercive force of film 34 is greater than that of film 10, preferably several times greater, for example five, to allow sufficient operating tolerances.

Though the foregoing description and accompanying drawing indicates that the pump field is applied along easy axis 12 with the magnetization axis of output line 16 being substantially perpendicular thereto, this is not an essential situation since, as fully described in the aforementioned Ehresman application, the easy axis of film 10 may be at any other desired position relative to the input and output lines 14 and 16. Further, the easy axis of films 10 and 34 need not be substantially parallel since the external field of film 34 can properly bias the magnetization vector of film 10 even though the easy axes are at an acute angle.

Films 10 and 34 may be on separate substrates (not shown) and manually or mechanically disposed adjacent each other, or they may be successively deposited mutually indiffusible in a single deposition cycle, as taught in the co-pending application of Allen, Serial No. 89,047, filed February 13, 1961, and now abandoned.

Thus, it is apparent that the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A phase locked parametric oscillator comprising two magnetic elements each of which has two stable substantially magnetized remanent states, said elements being disposed adjacent one another with a first one of the elements being biased in the direction of one of its stable states by the second of said elements, conductor means including two conductors disposed in inductive relation with said first element and crosswise of each other, magnetization oscillation means coupled to said conductor means including pumping means coupled to one of said conductors for applying a varying field to said first element for causing magnetic oscillation of said first element so as to effect an effective negative resistance across the other of said two conductors, and means included in said magnetization oscillation means and coupled to said other conductor for selectively applying thereto a first control signal of one phase or a second control signal having a phase 180° different than said one phase for causing from said other conductor an output signal which is in phase with the applied one of said first or second control signals when the said second element is biasing the said first element toward a given one of its two states but which is substantially 90° out of phase in a given direction from the applied one of said first or second control signals when the second element biases the first element toward the other of its two states.

2. A phased locked parametric oscillator comprising a first multi-stable state magnetic film having an effective oscillatable magnetization vector normally stable in either of at least two different directions respectively representing two substantially magnetized stable states of the film, a second multi-stable magnetic film disposed biasingly adjacent said first film and having an effective magnetization vector normally stable in either of and switchable between at least two different directions respectively representing two substantially magnetized stable states for biasing the said first film's magnetization vector toward one or the other of its said two directions, a tank circuit including an output line coupled to said first film, and means, including means for selectively coupling to said tank circuit first or second control signals which are 180° out of phase with each other, for causing oscillations in said tank circuit which in phase or 90° out of phase with the selected control signal according to whether the said second film is biasing the first film's magnetization vector toward one or the other of its said two directions.

3. Apparatus as in claim 2 wherein said second film has an external field and a coercivity which are substantially higher than the external field and coercivity respectively of the said first film.

4. Apparatus as in claim 3 wherein the said first film is a nickel-iron alloy and the second film is a cobalt-iron alloy.

5. A phase locked parametric oscillator comprising a first bistable magnetic film having an easy magnetization axis and an oscillatable magnetization vector normally stable substantially along said axis in either of two opposite directions to represent two respective stable states, a second bistable magnetic film disposed biasingly adjacent said first film and having an easy magnetization axis substantially parallel to the axis of said first film and an effective magnetization vector resting substantially along the said second film's magnetization axis in a given one of its opposite directions and switchable therebetween for biasing the said first film's magnetization vector toward one or the other of its said two directions, a tank circuit including an output line coupled to said first film, and means for causing oscillations in said tank circuit including means for selectively coupling to said tank circuit first or second control signals which are 180° out of phase with each other for causing the oscillations in the tank circuit to be in phase with the selected one of said control signals when said second film biases the magnetization vector of said first film towards a given one of its said two directions or, when the first film's magnetization vector is biased by the second film toward the other of its said two directions, to be out of phase with the selected control signal by substantially 90° in the same direction regardless of which of the first or second control signals is selected, whereby said tank circuit oscillations can be in any one of four different phases substantially 90° apart.

6. An oscillator as in claim 2 wherein the coercivity of the said second film is substantially higher than that of the said first film.

7. An oscillator as in claim 4 wherein said second film is of cobalt and iron composition.

8. A phase locked parametric oscillator comprising a first bistable magnetic film having an easy magnetization axis and an oscillatable magnetization vector normally stable substantially along said axis in either of two opposite directions to represent two respective stable states, a second bistable magnetic film disposed biasingly adjacent said first film and having an easy magnetization axis substantially parallel to the axis of said first film and an effective magnetization vector resting substantially along the said second film axis in a given one of its opposite directions and switchable therebetween for biasing the said first film's magnetization vector toward one or the other of its said two directions, means for selectively switching the said magnetization vector of said second film to either one of its said opposite directions, a tank circuit including an output line coupled to said first film, and means for causing oscillations in said tank circuit including means for selectively coupling to said tank circuit first or second control signals which are 180° out of phase with each other for causing the oscillations in the tank circuit to be in phase with the selected one of said control signals when said second film biases the magnetization vector of said first film towards a given one of its said two directions or, when the first film vector is biased by the second film toward the other of its said two directions, to be out of phase with the selected control signal by substantially 90° in the same direction regardless of which of the first or second control signals is selected, whereby said tank circuit oscillations can be in any one of four different phases substantially 90° apart.

(References on following page)

References Cited by the Examiner

UNITED STATES PATENTS

| | | | |
|---|---|---|---|
| 2,805,408 | 9/57 | Hamilton | 340—174 |
| 2,984,825 | 5/61 | Fuller et al. | 340—174 |
| 3,015,807 | 1/62 | Pohm et al. | 340—174 |

OTHER REFERENCES

Publication I: "Magnetic Film Parametric Amplifiers," by Read & Pohm, Proceedings of the National Electronics Conference 1959, pages 65–78.

IRVING L. SRAGOW, *Primary Examiner.*